US012664572B1

(12) United States Patent
Hubman et al.

(10) Patent No.: US 12,664,572 B1
(45) Date of Patent: Jun. 23, 2026

(54) METHODS FOR RAPID PRODUCT FORMULATION AND EFFICIENT MASS-CUSTOMIZATION

(71) Applicant: AlpStories, Inc., Atlanta, GA (US)

(72) Inventors: Danijel Hubman, Litija (SI); Astrid Androsch, Atlanta, GA (US)

(73) Assignee: AlpStories, Inc., Atlanta, GA (US)

( * ) Notice: Subject to any disclaimer, the term of this patent is extended or adjusted under 35 U.S.C. 154(b) by 146 days.

(21) Appl. No.: 17/829,242

(22) Filed: May 31, 2022

Related U.S. Application Data

(63) Continuation-in-part of application No. PCT/SI2021/050008, filed on Mar. 5, 2021.

(51) Int. Cl.
G06Q 30/00 (2023.01)
G06Q 30/0601 (2023.01)

(52) U.S. Cl.
CPC ................................ G06Q 30/0621 (2013.01)

(58) Field of Classification Search
None
See application file for complete search history.

(56) References Cited

U.S. PATENT DOCUMENTS

| | | | |
|---|---|---|---|
| 6,402,364 B1 | 6/2002 | Esclar et al. | |
| 2006/0087915 A1 | 4/2006 | Koniezko | |
| 2009/0287584 A1* | 11/2009 | Brown | G06Q 30/02 |
| | | | 705/26.1 |
| 2013/0123973 A1* | 5/2013 | Saranow | G06Q 30/0621 |
| | | | 700/233 |

| | | | |
|---|---|---|---|
| 2014/0098629 A1 | 4/2014 | Greter | |
| 2014/0279792 A1* | 9/2014 | Hudson | G16H 20/60 |
| | | | 706/46 |
| 2015/0009775 A1 | 1/2015 | Vogt | |
| 2015/0021356 A1* | 1/2015 | Witchell | B01F 33/848 |
| | | | 222/23 |
| 2019/0237194 A1* | 8/2019 | Salvi | G06N 5/04 |

(Continued)

FOREIGN PATENT DOCUMENTS

DE 19647617 A1 11/1996

OTHER PUBLICATIONS

Taanila, P., Designin Mass Customization: A Porduct Configurator for a Startup Company, 2014, Master of Arts Thesis for International Design Business Management, Aalto University of Arts, Design, and Architecture, pp. 1-109. (Year: 2014).*

(Continued)

*Primary Examiner* — Jeffrey A. Smith
*Assistant Examiner* — Brittany E Bargeon
(74) *Attorney, Agent, or Firm* — Neo IP

(57) ABSTRACT

The integration of preparation and production of the product, labeling, payment, and storage of individual recipes and name is facilitated under a principal brand and shipped directly to the customer. The selected product is made according to customer specific ingredient selections. The selected product may be a personalized or private-label branded cosmetic where the branded packaging or packaging label is similarly contemporaneously created. The automated manufacturing cell receives each relevant specific selected formulation ingredients are combined and filled into the selected the private labeled branded product packaging to create the finished product.

13 Claims, 4 Drawing Sheets

(56) References Cited

U.S. PATENT DOCUMENTS

2019/0391731 A1* 12/2019 Adler ................. G06F 3/04847

OTHER PUBLICATIONS

Taanila, P., Designing Mass Customization: A Product Configurator for a Startup Company, 2014, Master of Arts Thesis for International Design Business Management, Aalto University of Arts, Design, and Architecture, pp. 1-109. (Year: 2014).*
International Search Report, Application No. PCT/IS2021/050008.

* cited by examiner

METHODS FOR RAPID PRODUCT FORMULATION AND EFFICIENT MASS-CUSTOMIZATION

RELATED APPLICATIONS

Applications of related continuity are disclosed as part of the Application Data Sheet filed pursuant to 37 C.F.R. § 1.76. All Related Applications are incorporated by reference as if fully rewritten herein.

BACKGROUND OF THE INVENTION

1. Field of the Invention

The present invention relates generally to the creation and rapid formulation of individualized cosmetics, beauty care, nutrition, health and pharmaceutical products and, more particularly, to a system and method for the process of preparing made-to-order products that allows for rapid product formulation and efficient mass-customization.

2. Description of the Related Art

Individualized consumer products provided on a mass scale is generally rare in the current consumer marketplace. For medicaments, a compounded medication may be custom made for an individual by a "compounding pharmacy", a specific type of pharmacy that can make medications for people who have certain medication needs or requirements. However, such pharmacies are essentially local or regional, and widespread customization of products in these and other health and beauty areas still remain universally unavailable, for some of the reasons explained below.

The health, beauty, nutrition and wellness industries are very large, estimated at more than 4.4 trillion U.S. dollars in 2019 and estimated to increase to more than six trillion U.S. dollars by 2025. The current the status quo is the mass distribution of global brands by large multinational companies. For cosmetics, for example, sales and distribution is very much a physical retail experience using sales assistants at department stores ready with samples geared toward pleasing the senses of the customer in order to direct them toward a particular mass-produced product "made specially for them".

The largest growth and innovation in these product lines are now trending toward personalization of products, and brands distributed direct to a consumer. Technology has led to a digital transformation in the industry and, as such, technology is a core part of the development and marketing strategies to follow. For example, a current focus for skin-care companies is to attempt to control the industry shift toward digital and personalized solutions. Personalization of products has been rising with the advent of modern digital technology. Businesses have developed capabilities to measure what each individual wants; however, there are challenges in linking business processes and solutions to the creation and formulation of personalized products. This is equally true in relation with cosmetics, nutrition and health products.

Demand for natural health and wellness products are especially high and growing among the millennial cohort due to increasing awareness about the harmful impact of synthetic chemicals. Other drivers of such trends may also include:

Every woman's skin is unique, while mass market products are "one size fits all"; additionally, the growing segment of cosmetics for men trends toward separate branding and formulations;

Consumer are expecting transparency of ingredients which increases awareness that mass market products contain harsh chemicals; and Demographics are changing with an ethnically diverse Millennial generation.

In response, market trends today see three big systemic shifts that will redefine the future of the beauty industry. These include:

Science and Nature. More consumers are becoming interested in natural beauty products. That's because a focus on health today isn't confined to what consumers put in their bodies but more so what they put on their bodies. Consumers exploring the push-pull between nature and science; each must support the other to expand beauty consumption.

Personalization. With consumers often unsure of their requirements, brands can be a source of inspiration or offer suggestions and assistance via their customization options. Consumers are keen to express their uniqueness. Personalization allows consumers to express their unique character, while offering clear benefits.

And, Connection. Advances in software, hardware, apps, and augmented reality herald the Fourth Industrial Revolution and significantly change the way consumers choose, purchase, and interact with products. The 'vegan' trend is evolving into an understanding of biotechnology. As lab-grown products continue to enter the market, consumers' comfort with biotechnology increases. Clean beauty evolves as consumers do more research than ever before when making product choices and brand transparency spans the product life cycle.

With the intersection of these market trends with the technological capability for integration through the Internet of Things, the capability can exist to measure, monitor, and integrate data in a manner that will change behavior due to seamless product offerings that fit such trends. The use of emotion-driven tech can also be used to measure potential success of a product and navigate pricing before it launches. And, the use of data can increase access to consumers' preferences and reliance on psychographics can develop a better understanding of customers behaviors.

However, technical problems impede the implementation of these trends. Current manufacturing, branding and distribution of cosmetic, beauty, health or nutritional products do not easily or economically accommodate modifying a product formulation specifically according to individual wishes, or creating numerous sub-brands under one principal brand. One method and device are known that incorporate various mechanisms for the preparation and purchase of individualized cosmetics is known and taught in U.S. Pat. No. 10,332,174, issued in the name of Hubman. The '174 patent teaches a method and device where a consumer may obtain a skin analysis via a video recording and/or photograph of the skin in order to identify product formulations from a database as part of product personalization. While foundational and providing a significant platform upon which improvements can be built, a need still exists for systems and methods and improvements thereupon that allow for the manufacturing of individualized recipes and/or sub-branded product promotions.

SUMMARY OF THE INVENTION

It is thus objects of the present invention to provide a system and method that allow for rapid product formulation and efficient mass-customization.

It is other objects of the present invention to provide a system and method that allow for rapid product formulation and efficient product personalization.

It is additional objects of the present invention to incorporate such systems and methods allow for direct to consumer creation and distribution of made-to-order products.

It is further objects of the present to allow for contract manufacturing to allow companies to offer customized end-to-end solutions in a private label manner in order to rapidly enter the health and beauty care market with personalization of products in an effective manner.

It is a feature of the present invention to connect a process of ordering products made by basic recipes with a mechanism for modifying the recipe according to customers' wishes.

Further, the present invention facilitates the integration of preparation and production of the product, labelling, payment, and storage of individual recipes and name under a principal brand as well as product shipping to the customer. The main task of the invention is to design a system or device, which will execute the process, and that the selected product will be made according to customer specific ingredient selections.

Briefly described according to a preferred embodiment, the present invention provides a method for creation of a consumer-initiated personalized or individualized health or beauty product. An online portal may enable a procurement selection whereby a customer, from a customer data set database, may identify a product selection from a range of product types. A product packaging may thereby be selected, and a formulation diagnostic initiates a formula creation algorithm comprising an interactive user interface for collection of customer specific information through user provided data input and operatively directing a recommended unique formulation adaptable for the preparation of a made-to-order consumer-initiated individualized cosmetics, beauty care, nutrition, health or pharmaceutical products. A production template with a final formulation recipe may be operatively directing as a recipe for operational control of an automated manufacturing cell in which each relevant specific selected formulation ingredients are combined and filled into the selected product packaging to create a finished product.

According to another aspect of the present invention, the systems and methods provided may be used for creation of a private-label branded cosmetics, beauty care, nutrition, health and pharmaceutical products where the same or similar online portal may be used to enable a product formulation. Additionally, the online portal may further enable the creation of the product packaging and the creation of a branded packaging or packaging label that can be uploaded or made, previewed, modified and finalized for production and where the automated manufacturing cell in which each relevant specific selected formulation ingredients are combined and filled into the selected the private labeled branded product packaging to create the finished product.

It is an advantage of the present invention to provide a system that is capable of formulating a very large number of formulation permutations in a rapid manner.

It is another advantage of the present invention to allow for rapidly formulation that can depend upon individual needs, preferences, ingredients, fragrances, concentration, or otherwise individualized to a selecting consumer.

It is yet another advantage of the present invention to allow for small batch formulations without the need for hand mix or semi-hand mix production techniques.

It is still another advantage of the present invention to enable a consumer to mix their own product formula to create a customized beauty product for their individual needs using an advanced algorithm for true customization.

Further objects, features, elements and advantages of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1A:
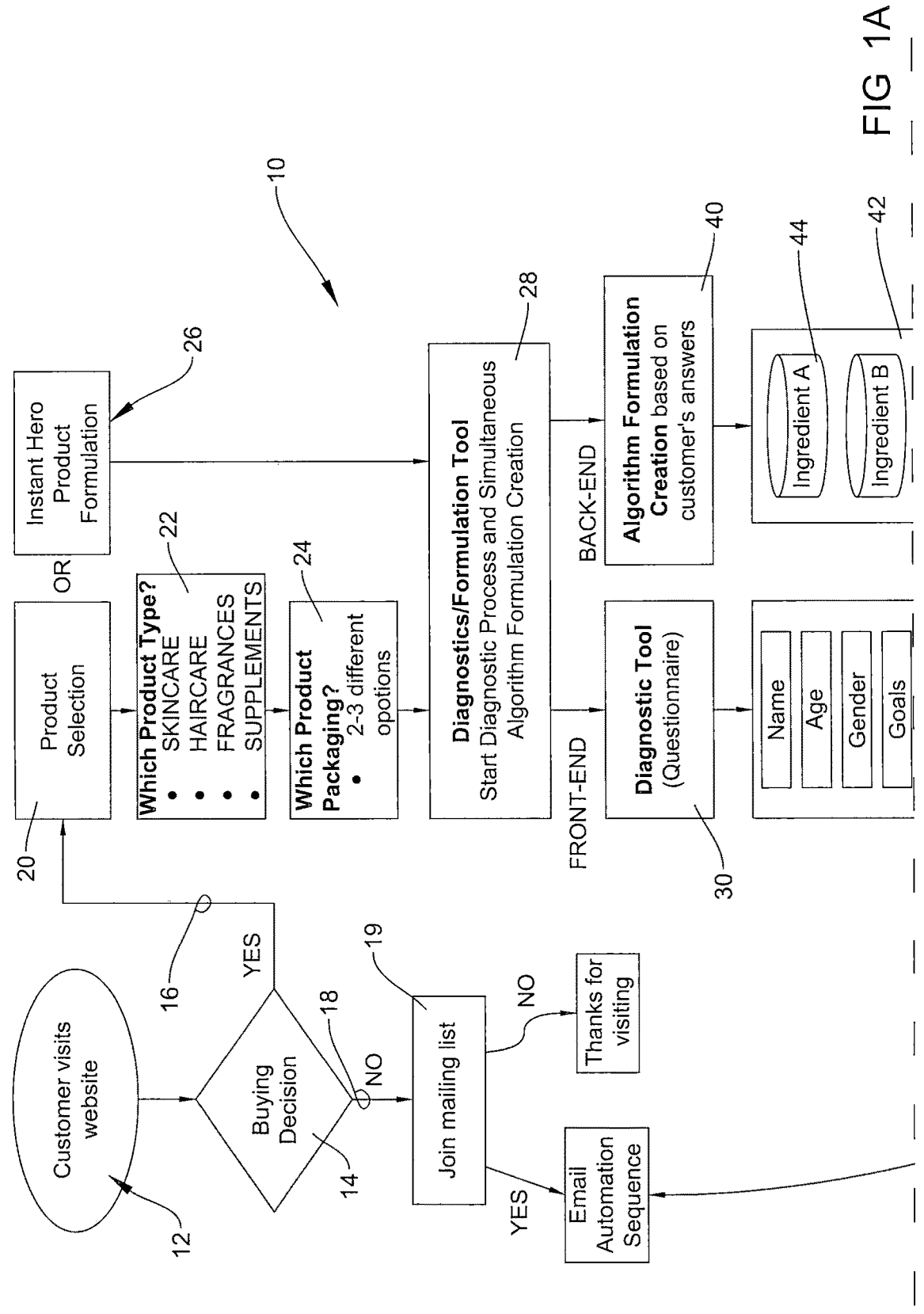
FIG. 1A and FIG. 1B are a process flow diagram of the process according to the preferred embodiment of the present invention capable of to formulating millions of different formula variations rapidly depending on individualized customer input.
Figure 1B:
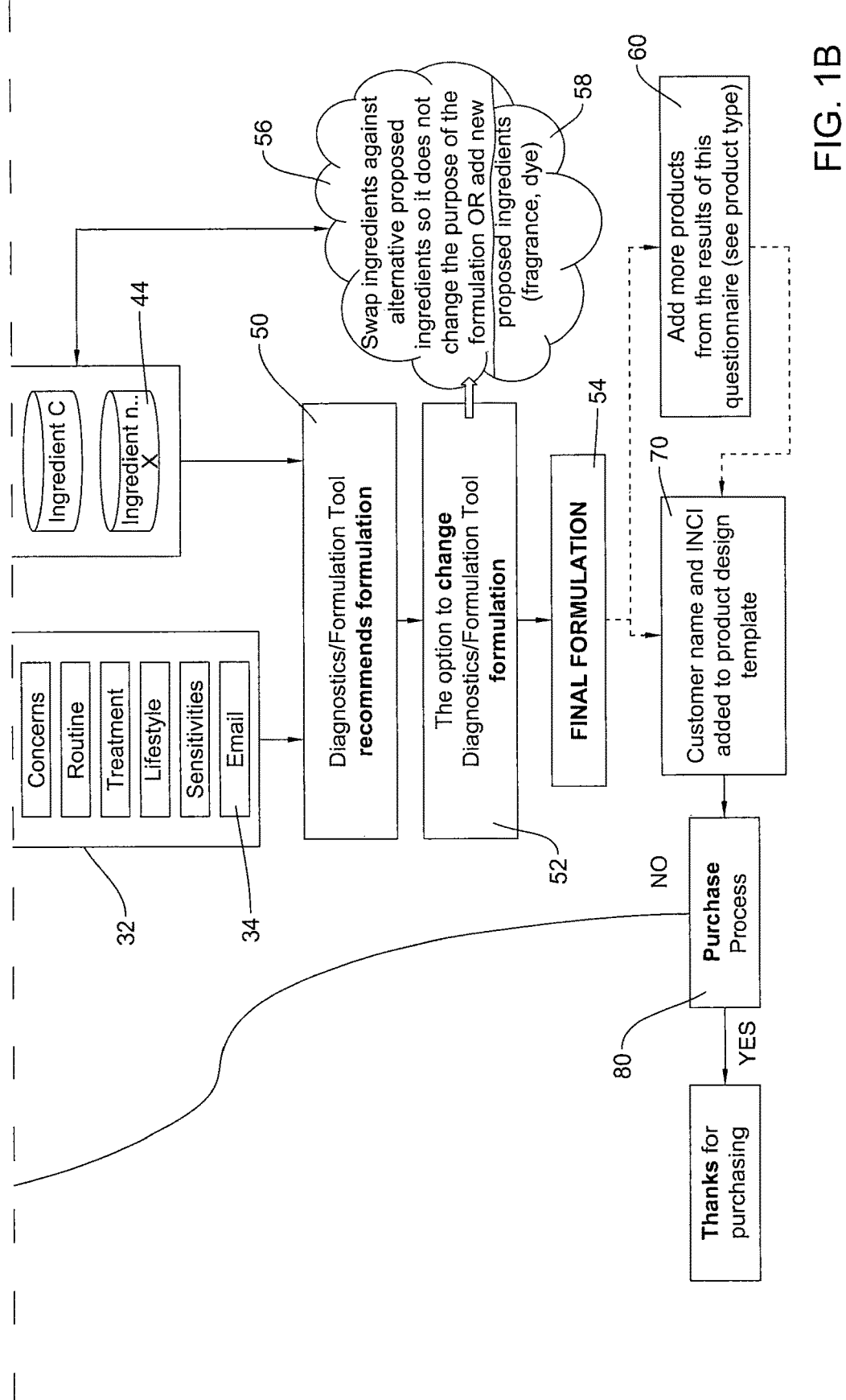

The essence of the process for preparation and purchase of individualized cosmetics, beauty care, nutrition, health and pharmaceutical products that enables consumers or product marketers to mix their own product formula to create a customized or personalized health or beauty product for an individual's needs using an advanced algorithm for true customization. As described in conjunction the drawings, wherein like reference numerals indicate the same parts throughout the several views, the product customization process, generally noted as 10, is preferrably enabled using an online, direct to consumer portal 12 where the consumer confirms a buying decision 14 in which a selection is made to procure a product 16 or merely provide contact information 18 for addition to a customer database 19 for access during later communication. When a procurement decision 16 is made, the customer confirms the decision to prepare and purchase an individualized cosmetics, beauty care, nutrition, health and pharmaceutical (for purposes of the present invention, referred herein generally as "cosmetic") product by identifying a product selection 20 whereby a range of possible product types may be presented 22. By way of example, and not meant as a limitation, the product types may include any type of health and beauty product such as facial cream, hand cream, lip balm, shampoo, body milk, etc. For purposes of the present invention, "health and beauty" products are to be broadly construed as health product or beauty product, interchangeably, or their equivalent. By way of example, and not meant as a limitation, any topical agent for hair, skin or nails, as well as medicaments, vitamins, supplements, nutritional products, sports or energy drinks or any similar or equivalent consumer product.

Once the product type 22 is selected, while it is intended that one or more standard product packaging selections may be provided, in a preferred embodiment a user may further be provided with the option of selecting a product packaging 24. Product packaging selection may comprise any number of different options of packaging size and/or configuration.

Optionally, an expedited method of selection, generally noted as 26, may be provided directing a customer directly to primary product selection, bypassing product selection 20 that would otherwise require product type 22 and product packaging selections 24 and thereby allowing the customer to access directly a diagnostic process 28 as described in greater detail below. The ability to have such an expedited, bypass entry into the diangostic process 28 may allow for a manufacture to advertise a specific product selection and direct a customer directly to the personalization process. By was of example for purpose of clarity, and not meant as a limitation, the system 10 is shown herein with two separate ways of entering the diagnostics: either via choosing a product and size first; or, by directly clicking on a priority product. Such a bypass selection may thereby be utilized in online or social media advertising such that when a consumer clicks on advertisement for a product, they are directed straight into diagnostic quiz for such an advertised product.

Once a product selection has been made, a formulation diagnostic tool 28 may be initiated in which a diagnostic process initiates a formula creation algorithm. The diagnostic process 28 may include a front end diagnostic tool 30 and a formula creation algorithm 40.

The front end diagnostic tool 30 may comprise a customer interface for collection of customer specific information 32 through user provided data input. Such information 32 may include demographic related information (e.g., name, age, gender, etc.) as well as other customer selected criteria such as goals, concerns, routines, existing treatments, lifestyle elements, sensitivities or the like. A user identifiable sobriquet 34 may further be prompted for and accepted, such as a user name or email address or similar customer identifier that to the customer database 19 allowing a customer to easily reorder for subsequent purchases and/or provide a bypass interface starting point 26 for direct use or for alteration during subsequent visits.

The front end diagnostic tool 30 may provide operative communication with the formula creation algorithm 40. The inputting and receipt of user preferences 32 may be accessed iteratively and a formulation database 42. The front end diagnostic tool 30 may function by a quiz format (i.e., question or prompt to the user for an answer) in order to facilitate a personalized formulation. Personalized formulation for a health and beauty product may comprise prompts for a number of different parameters, both user oriented and ingredient oriented. By way of example, and not meant as a limitation, in the formulation of shampoo or body lotion the parameters for formulation may include hair type, texture, hair density, scalp moisture, treatment (color/bleach, etc.), hair goals (color, volume, rescue, heat protection, etc.). Similarly, in response to the various inputs to customer specific information 32 the formulation database 42 may select ingredients and ingredient amounts for a variety of appropriate ingredient selections 44.

The diagnostic tool receives user inputs such as age, skin type, and specific concerns (e.g., dryness, acne). The algorithm processes these inputs using a database of ingredients and formulation rules to generate a recommended product formulation. This process involves selecting appropriate ingredients and their concentrations to meet the user's needs, ensuring the formulation's effectiveness and safety. The net result of the front end diagnostic tool 30 initiating the formula creation algorithm 40 is the creation of a recommended unique formulation 50 adaptable for the preparation of made-to-order beauty care, nutrition and health products. It is further intended that once an initial formulation recommendation 50 is presented, the customer may be provided with an option to adjust or modify 52 the recommended formulation 50 in order to resolve a final formulation 54. During the formulation adjustment 52 it is preferred that particular ingredients 44 that are selected may be replaced with alternative proposed ingredients. It is further preferred that there be system limitations place on the replacement of ingredients 56 such that the purpso of the formulation ingredient is not significantly changes (e.g., oily, dry, combination, acne prone, sun sensitive, sensitive, allergy tested, poor texture, large pores, etc.). Further still, the inclusion of additional non-active ingredients 58, such a fragrances, dyes or the like may be further facilitated.

Once a final formulation 54 is obtained, a user may be prompted to add additional products to an order 60. Such a prompt 60 may redirect the user back to purchase additional individualized cosmetic product from the selection interface 20.

Upon completion of the total number of final formulation selection 54, each final formulation 54 may be operatively directed as a template fpr production data 70 and communicated with a production system in which a final formulation 54 is directed as a recipe for operational control of an automated manufacturing cell in which each relevant specific selected formulation ingredients are combined and filled into the selected product packaging to create a finished product that may be conveyed to packaging and distribution. As part of the product data template 70 the customer's contact information and International Nomenclature Cosmetic Ingredient (INCI) information may be included to allows for rapid product formulation and efficient mass-customization.

The automated manufacturing cell receives the final formulation data from the online portal. It combines the selected ingredients in precise amounts and fills the product into the chosen packaging. This automated process ensures consistent quality and efficiency, reducing the need for manual intervention and allowing for scalable mass-customization. Once finalization of a customer's order is completed a purchase process 80 may be initiated to complete purchasing information and instruction from the customer.

2. Operation of the Preferred Embodiment

In operation, the product customization process 10 provides a capability of individually formulating millions of different formula variations rapidly depending on individual needs, preferences, ingredients, fragrances, concentration, etc. Each user's individualized selection is customized directly to the consumer's specific conditions, and every distinct individual may be provided a selection of products customizable and designed each specifically customized. Consumers are thereby enable to mix their own product formula to create a customized beauty product for their individual needs using an advanced algorithm for true customization. The diagnostics tool and interface assists and guides the consumer to create a formula that addresses their own unique beauty and health needs and preferences, thereby providing the choice of a selection that makes the consumer the producer.

Figure 2A:
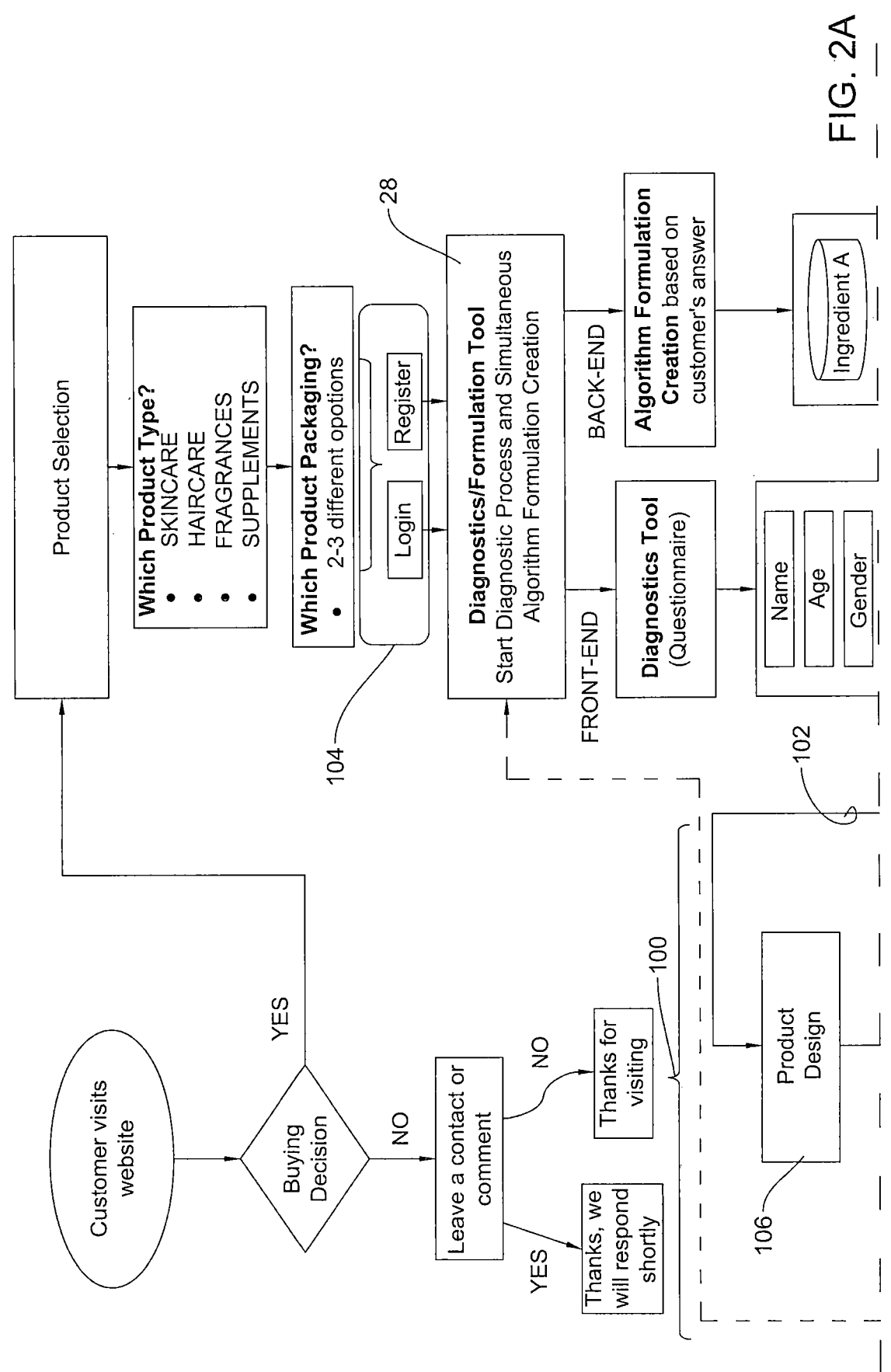
FIG. 2A and FIG. 2B are a process flow diagram of the process according to the preferred embodiment of the present invention adapted to include a private label manufacturing.
Figure 2B:
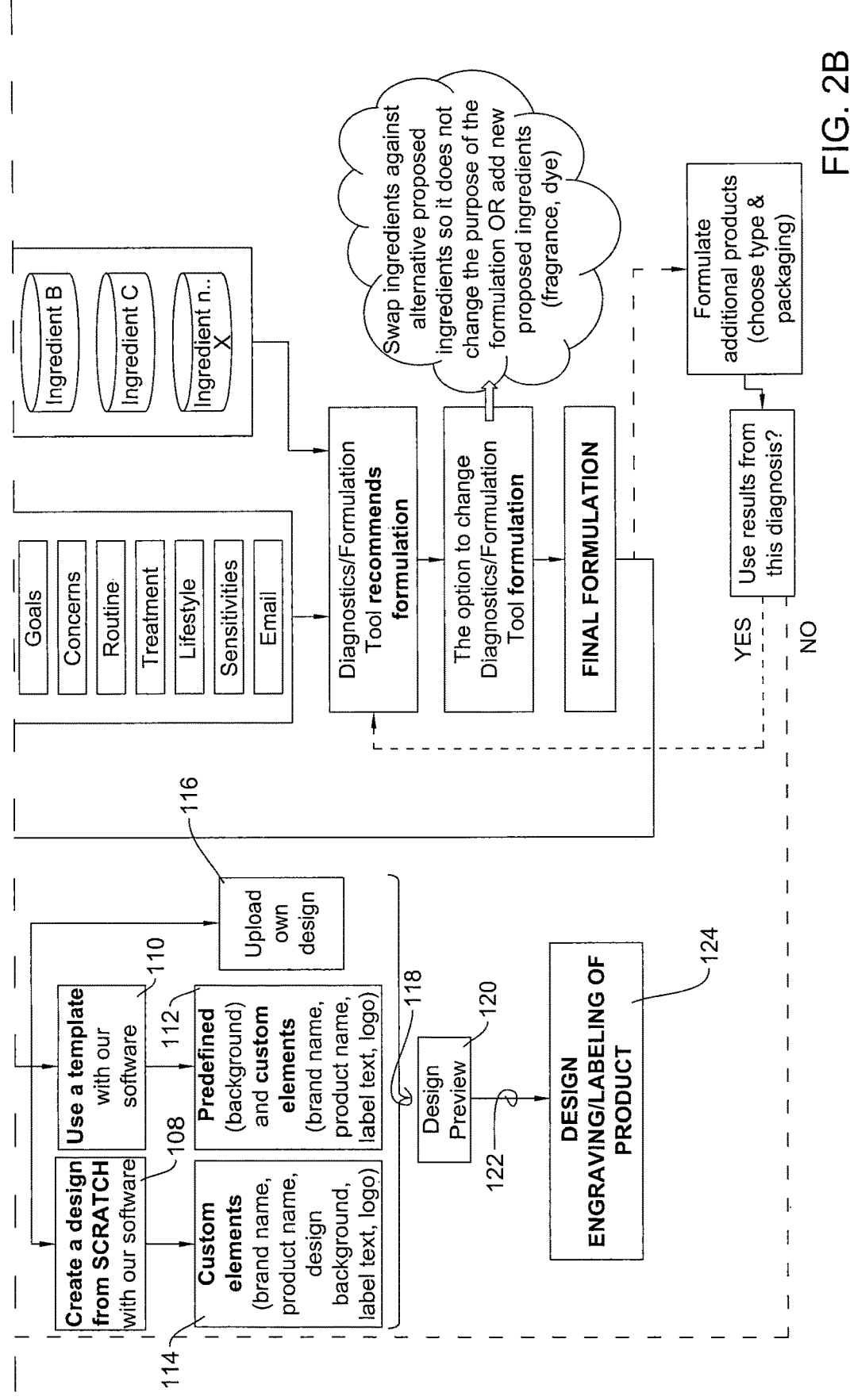

It should become apparent in light of the present disclosure that the invention is capable of other embodiments and of being practiced or carried out in a variety of ways. By way of example, and not meant as a limitation, as shown in conjunction with FIG. 2, the process according to the preferred embodiment of the present invention may be adapted to include a private label manufacturing. The current model offers companies a customized end-to-end solution to rapidly enter the health and beauty care market for a private label business venture by gathering information directly from the company/client via the product customization process 10 and interfacing directly with a private label design system 100 that may manage instant product formulations in a third-party, private label manufacturing process to allow companies the ability to create their own product design using prior developed formulations, or with application of their own proprietary formulations that are transmitted directly to production, allowing for the maximum efficiency of the serial production of made-to-order business-to-business ("B2B") products.

In creating a new brand from scratch, whether by a large retailer or a small e-commerce company, a number of difficulties and hurdles exist, from the cost and ability of manufacturing to product formulation designs to packaging configurations. Smaller brands and startups may specifically struggle with finding affordable and reliable options, as larger manufacturers offer incredibly high minimum order quantities ("MOQs").

However, according to customer insights from Information Resources, Inc., a data analytics and market research company which provides consumer, shopper, and retail market intelligence and analysis focused on the consumer packaged goods (CPG), retail, and healthcare industries, shopping habits are changing in that, inter alia, up to 67% of shoppers believe that private labels offer extremely good value for money, with Millennials being a significant driving forces toward private labels. One survey found that millennials buy private-label products at a higher rate (e.g., 32% vs. 25%) than average shoppers. Such a shift in demand shifts provide opportunities for product differentiation and exclusive brands to keep up with the change in shopping habits for health, beauty, and skincare products.

To facilitate such opportunity and demand, the private label design system 100 in conjunction with product customization process 10 may be adapted to create a cyber-physical "smart factory" wherein communication between customer, product marketer and private label manufacturer communicate and cooperate in a real-time supply chain. Companies may be able to rapidly create a target-specific brand (or multiple brands) and/or product line with different product formulations and designs simultaneously, as compared to what would usually take weeks. Further, companies also will may private-label products in extremely low quantities, starting at minimum order quantities of a few as five pieces. Acquiring data 102 to create the desired brand and custom products may be done via a private label portal 104 where a company directly engage with the diagnostic tool 28 operative communicate with the formula creation algorithm 40 to access the formulation database 42 in a similar manner as described above. By adapting the innovation for use by a private label product marketer, one or many final formulations 54 is obtained, a user may be prompted to add additional products to an order 60. Such a prompt 60 may redirect the user back to purchase additional individualized cosmetic product from the selection interface 20.

Upon completion of the total number of final formulation selection 54, each final formulation 54 may be operatively directed as a template formulation, and the data 102 is operatively provided to a product design system 106 to allow for creation of a desired brand and custom product. This system allows companies to create a design from scratch 108, or upload their own, existing design 110. When choosing to create a design from scratch 108, a company may choose between beginning with a template 112 starting with standard elements, or using a custom creation tool 114 where custom elements may be created and/or imported. Such product elements may include various design theme such a logos, brand names, product names, label text colors or the like. Alternately, a custom product design 116 may be uploaded for subsequent use. Once the design is finished or uploaded 118, a preview of the product design 120 may be displayed to allow the company to confirm the visual components. Once approved 122, the products are sent in the queue for production and product packaging and labeling may be generated 124 for immediately use after completion of a purchasing request.

Such a private label solution allows brands of all sizes to be able to private label their unique products and serve them to their target groups with the click of a few buttons, and with the savings of time and money without adversely effecting product quality or safety.

It is to be understood that the phraseology and terminology employed herein is for the purpose of description and not of limitation. It should be further apparent to a person having ordinary skill in the relevant art, in light of the present teachings, that the discussed enablement being described for use with providing private label and wholesale buyer with a holistic supply chain solution that eliminated the lengthy and expensive formulation process. By leveraging skin diagnostics powered by the formulation algorithm, users may rapidly and easily create their own brand and product line on the push of a button and thereby provide a system that allows to easily create and adjust a product portfolio.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of *Warner-Jenkinson Company,* v. *Hilton Davis Chemical,* 520 US 17 (1997) or *Festo Corp.* v. *Shoketsu Kinzoku Kogyo Kabushiki Co.,* 535 U.S. 722 (2002), or other similar caselaw or subsequent precedent should not be made if any future claims are added or amended subsequent to this Patent Application.

What is claimed is:

1. A method for creation of a consumer-initiated individualized health or beauty product, comprising:

providing an online portal for enabling a procurement selection comprising:

creating a customer data set in a customer database;

identifying a product selection from a range of product types;

identifying a product packaging selection;

initiating a formulation diagnostic tool configured to generate a product formulation based on interactive user-specific inputs, the formulation diagnostic tool comprising a formulation creation algorithm that processes the interactive user-specific inputs and generates a recommended unique formulation recipe comprising active ingredients, constrained by ingredient purpose retention parameters;

wherein the user-specific inputs include existing treatments of a user;

wherein the formulation diagnostic tool is configured to modify the product formulation by replacing at least one active ingredient with an alternative active ingredient based on the interactive user-specific inputs and constrained by the ingredient purpose retention parameters before manufacturing the product formulation;

creating a production template including machine-readable instructions for automated combination and packaging of the product formulation;

operatively directing the production template including the machine-readable instructions for the automated combination and packaging of the product formulation; and operatively directing the production template as production data to an automated manufacturing cell, the production data controlling the automated manufacturing cell to combine each specific ingredient of the product formulation and fill the product formulation into the selected product packaging to create a finished individualized product.

2. The method of claim 1, wherein the user-specifics inputs are selected from a group consisting of: demographic information, health information, lifestyle information, historical product reaction information, and a user-identifiable sobriquet.

3. The method of claim 1, further comprising distributing the finished individualized product to a consumer.

4. The method of claim 3, wherein distributing the finished individualized product to the consumer further comprises labeling the finished individualized product with customer contact information and International Nomenclature Cosmetic Ingredient (INCI) information.

5. The method of claim 1, further comprising using machine learning algorithms to refine the formulation creation algorithm based on user feedback and product performance data, wherein the machine learning algorithms:

analyze patterns in customer preferences and product efficacy;

identify correlations between specific ingredients and customer satisfaction;

adjust ingredient combinations and concentrations based on analyzed data; and continuously update the formulation creation algorithm to improve product customization accuracy over time.

6. The method of claim 1, wherein formulation adjustment is allowed by the user prior to generation of the production template, and the system restricts ingredient substitution based on ingredient category and function.

7. The method of claim 1, wherein the product formulation is locked and transmitted to the automated manufacturing cell in real-time, immediately following confirmation of purchase.

8. A method for creation of a private-label branded health or beauty product comprising:

providing an online portal for enabling a procurement selection comprising:

creating a customer data set in a customer database;

identifying a product selection from a range of product types;

initiating a formulation diagnostic tool comprising a formula creation algorithm that collects customer specific information through an interactive user interface, the collected information being used by the formula creation algorithm to generate a recommended unique formulation; and creating a production template with a final formulation recipe;

wherein the customer specific information includes existing treatments of a user;

wherein the formulation diagnostic tool is configured to modify the recommended unique formulation by replacing at least one active ingredient with an alternative active ingredient based on interactive user-specific inputs and constrained by ingredient purpose retention parameters before manufacturing the final formulation recipe;

the online portal enabling a creation of a product packaging of a selected brand design comprising:

creating a branded packaging or packaging label including brand elements selected from a group consisting of: logos; brand names; product names; label text; and label colors;

previewing the created branded packaging or packaging label;

modifying the created branded packaging or packaging label;

approving the previewed branded packaging or packaging label; and producing the branded packaging or a packaging with the packaging label;

operatively directing the production template as production data to an automated manufacturing cell, the production data controlling the automated manufacturing cell to combine the specific ingredients of the final formulation recipe and fill the final formulation recipe into the produced branded packaging to create a finished product.

9. The method of claim 8, wherein creating the branded packaging or packaging label further includes uploading to the online portal for enabling the creation of the branded packaging or the packaging with the packaging label.

10. The method of claim 8, wherein the product selection is selected from a group consisting of: shampoo; hair conditioner; non-medicated scalp treatment cream; hair oil; hair styling preparations; facial cleansers; facial moisturizers; non-medicated facial treatments; skin serums; night cream; facial masks; body soak for the bath; massage oil; moisturizing body oil; body moisturizer in the nature of creams and lotions; essential oils for aromatherapy; lipsticks; nail gel-polishes or other nail supplies; eye and facial masks; fragrances; deodorants; medicaments; vitamins; supplements; nutritional products; and sports or energy drinks.

11. The method of claim 8, further comprising distributing the finished product to a consumer.

12. The method of claim 11, wherein distributing the finished product to the consumer further comprises labeling the finished product with a customer's contact information and International Nomenclature Cosmetic Ingredient (INCI) information.

13. A method for creating a customized health or beauty product, comprising:

providing an online portal for enabling user interaction;

receiving customer-specific information through an interactive user interface, wherein the customer-specific information includes demographic, health, lifestyle, historical, and user identifiable sobriquet information;

initiating a formulation diagnostic tool adapted to initiate a formula creation algorithm comprising an interactive user interface for collection of the customer specific information through user provided data input and operatively directing a recommended unique formulation adaptable for the preparation of a made-to-order consumer-initiated individualized cosmetic;

wherein the customer specific information includes existing treatments of a user;

wherein the formulation diagnostic tool is configured to modify the recommended unique formulation by replacing at least one active ingredient with an alternative active ingredient based on interactive user-specific inputs and constrained by ingredient purpose retention parameters before manufacturing the recommended unique formulation;

generating the recommended unique formulation based on the received customer-specific information using the formulation diagnostic tool;

displaying the recommended unique formulation for user review and modification;

approving a final formulation;

directing the approved final formulation for production, wherein the production comprises:

combining specific selected formulation ingredients in an automated manufacturing cell;

filling a selected product packaging with the combined specific selected formulation; and labeling a final product with the customer-specific information, wherein the labeling further includes International Nomenclature Cosmetic Ingredient (INCI) information and a unique identifier linking the product to the combined specific selected formulation.

\* \* \* \* \*